March 3, 1970  J. F. NELSON ET AL  3,498,141
LIQUID LEVEL INDICATOR IN PROTECTIVE ENVIRONMENT
Filed Jan. 13, 1969
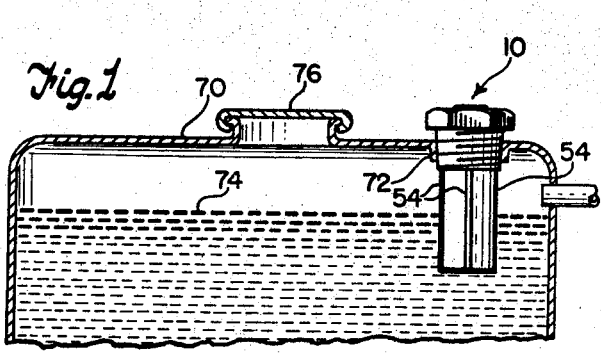
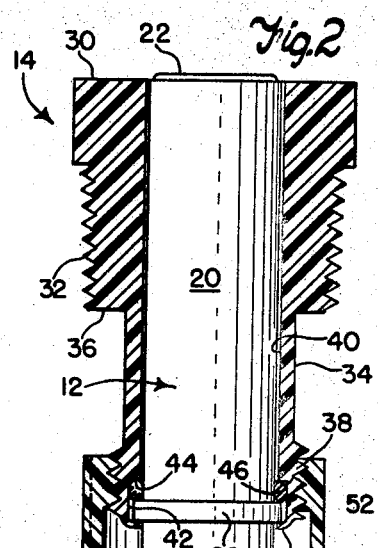
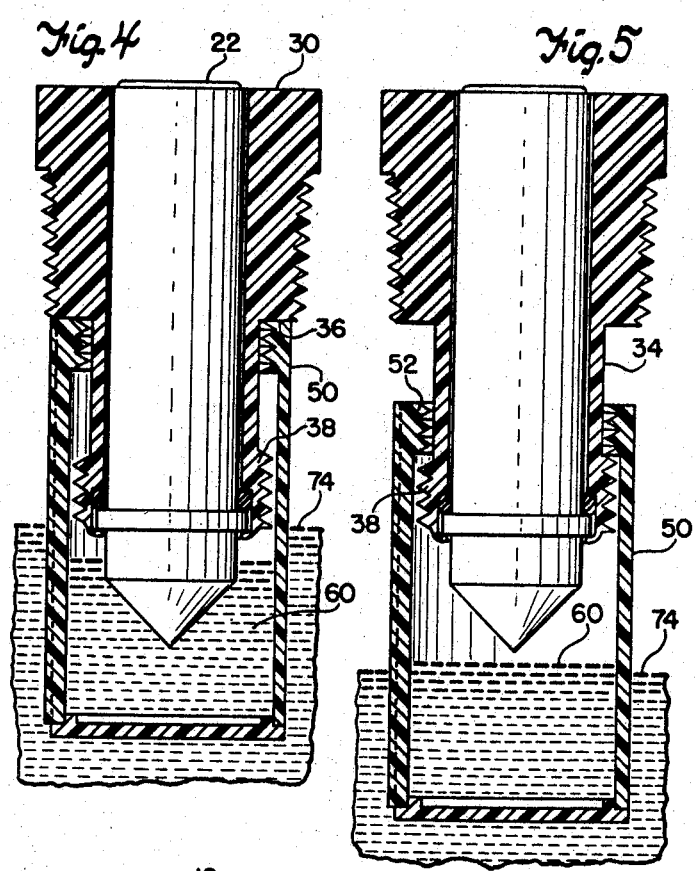
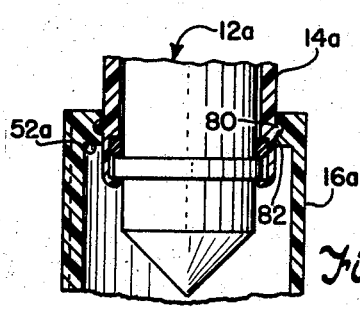
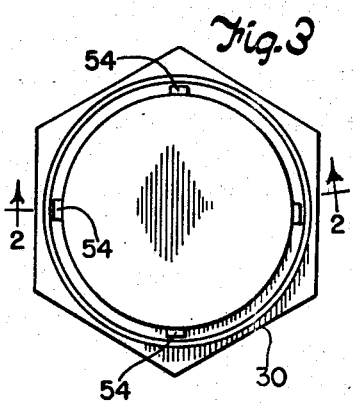
INVENTOR.
John F. Nelson
Ougljesa Jules Poupitch
BY
Their Att'ys

United States Patent Office 3,498,141
Patented Mar. 3, 1970

3,498,141
LIQUID LEVEL INDICATOR IN PROTECTIVE ENVIRONMENT
John F. Nelson, Des Plaines, and Ougljesa J. Poupitch, Itasca, Ill., assignors to Illinois Tool Works Inc., Chicago, Ill., a corporation of Delaware
Filed Jan. 13, 1969, Ser. No. 790,655
Int. Cl. G01f 23/06
U.S. Cl. 73—319                                                    10 Claims

ABSTRACT OF THE DISCLOSURE

An optical liquid level indicator for a container having a protective casing including a buoyant portion which contains a measured amount of controlled liquid, the buoyant portion of said casing being movable relative to the indicator by the varying liquid levels in the container, and the controlled liquid being isolated from the liquid in the controlled liquid being isolated from the liquid in the container or external environment in which the user wishes to measure a state of change.

BACKGROUND OF THE INVENTION

Liquid level indicators which use the optical properties of a glass or plastic rod-like member have been used to indicate a presence or absence of liquid material within a container at a given level or levels. Unfortunately certain types of indicators are affected by hostile fluids that might be in the container which are deleterious to the stability of the indicator and often result in a deterioration of its physical qualities by corrosion of other processes. Similarly, contaminating or contaminated liquids can coat the indicator in such a way as to limit its refractive and reflective qualities and thereby render it ineffective. Often, the refractive index of the liquid that the indicator is confronted with affects the optical properties to the indicator and prevents its effective use.

SUMMARY

This invention relates to an optical liquid level indicator which is provided with a protective casing which envelopes the major portion of the indicator except those portions necessary for its optical effectiveness. In addition to the casing a housing is provided which is buoyant in the liquid to be measured and which may be opaque but basically the housing is moveable relative to the protective casing and its mounted indicator. The housing serves as a reservoir to contain a controlled liquid which is isolated from the controlling liquid to be measured. As the controlling liquid rises and falls the buoyant housing also will move relative to the indicator thereby bringing the controlled liquid into contact and out of contact with the extremity of the indicator thereby indicating the liquid level of the controlling liquid in a container whose level the user wishes to measure.

DRAWING

FIG. 1 is an elevational view in partial section showing an embodiment of the present invention installed in a container, i.e. a radiator in which it is desired to control the level of the coolant or liquid therein;

FIG. 2 is an elevational view in partial section showing an embodiment of the present invention in its assembled relationship as taken along line 2—2 of FIG. 3;

FIG. 3 is an end view viewed from the bottom end of FIG. 2 as shown in the drawing;

FIGS. 4 and 5 are elevational views in partial section showing the device of FIG. 2 in differing environmental conditions; and FIG. 6 is a partial elevational view in section showing a modification to the embodiment of the present invention.

DESCRIPTION

Referring now to the drawing wherein similar numerals are utilized to designate similar parts throughout the drawing, a protected environment liquid level indicator 10 of the type contemplated by the present invention may include an indicator 12, a retainer casing 14 and a float housing 16.

The indicator 12 generally includes an elongated body portion 20 having an upper end surface 22 adapted to collect ambient or artificial light from a suitable source and at its opposite end a reflective means 24 which in the present embodiment takes the form of the 90° included angle cone. Intermediate the extremities of the body 20 there is provided an integral flange means 26 for purposes best set forth hereinafter. Other forms of optical liquid level indicators will be apparent to those skilled in the art since it is known that the collecting surface 22 may take various configurations for increasing the amount of collection surface as well as to provide a secondary means of observation. Similarly, the lower extremity 24 may be wedge shaped or stepped to provide other forms of reflective surfaces as well as facilitating the indication of various levels of liquid in contact with this lower extremity.

The indicator retainer or protective casing 14, in the present embodiment, includes enlarged wrenching head portion 30 provided, at the lower extremity of said head portion, with male thread means 32. The casing 14 is reduced in diameter as at 34 to provide an abrupt shoulder or stop 36 for purposes set forth hereinafter. In the present embodiment and lower extremity of the casing 14 is slightly enlarged to provide secondary male thread means 38. The casing 14 has a through bore 40 which at the lower extremity, as viewed in the drawing, is counterbored as at 42 to provide an internal stop or shoulder 44. In the present embodiment a sealing means 46 is positioned within counterbore 42 against the stop 44. The indicator 12 is axially telescoped within bore 40 until the flange 26 is brought to bear against the sealing means 46, in the present instance an O ring preferably of Buna-N material, although other materials would be satisfactory. The casing 14 has a flange 48 which is rolled over to engage the side of flange 26 opposite the side engaged by the O-ring 46 to retain the indicator in assembled relation to the casing 14. The flange 48 can be deformed by heat spinning or by mechanical working to accomplish the assembly.

In the present embodiment, the float body 16 includes a generally elongated shell 50 having, in this embodiment, an inwardly directed flange 52 provided with female threads complementary to the male thread 38 formed on the lower extremity of the casing 14. The exterior of the shell 50 is provided with suitable wrenching means, in the present instance a plurality of axially extending ribs 54 for purposes set forth hereinafter. At the end of shell 50, opposite flange 52, a disc 56 extends across and seals the end of the shell 50. The disc 56 may have an axially extending centering flange 58 complementary to the internal diameter of the shell 50 for locating purposes. The disc 56 can be assembled to the shell 50 by mechanical means such as a press or force fit or may be adhesively secured thereto.

After the indicator 12 has been assembled in casing 14, the housing 16 is assembled thereto with a measured amount of fluid 60 disposed within the lower extremity of the shell 50. The amount of liquid that is introduced to the interior of shell 50 is controlled so that its axial measurement, as measured from the upper surface of disc 56 to its upper surface 60, bears a distinct relationship to the axial length of the unthreaded portion 34 and the projection of the lower end 24 of the indicator below the flange 48. The device is shipped to the ultimate user in the condition shown in FIG. 2.

Upon receipt of the device the user will rotate shell 50 and its associated screw thread 52 until the threads overlie the male threads 38 and the housing 16 is axially freely movable relative to the retainer 14. The user will then insert the entire assembly into a container 70 through a suitable threaded aperture 72 provided with complementary means, in the present instance screw threads, to accept the threads 32 in the head section. When the level of the controlling liquid 74 which is introduced into the container 70 by means of a covered port 76, is at its desired height, the housing 16 will float upwardly to a maximum point where the upper extremity of flange 52 contacts the shoulder stop 36, as seen in FIG. 4. At this point, or slightly below the contacting point, the controlled liquid 60 will be in intimate contact with the lower end 24 of the indicator and the upper end 22 will show a darkened surface indicating that the housing 16, which is buoyant, has been raised to the proper level by the controlling liquid 74. When the level of liquid 74 is below the desired level, the housing 16 will move axially relative to the indicator, removing the controlled liquid 60 from contact with the extremity 24 and thereby permit the reflection of light back to a viewer observing the upper end 22 to indicate the necessity for introducing additional controlling liquid 74 through the port 76. This latter condition of the protected indicator is best seen in FIG. 5.

An assembly of this type has the distinct advantage that the materials which will not be affected by the liquid 74 can be utilized in place of introducing the indicator directly into the deleterious liquid. Quite often the assembly permits the use of a shorter indicator than is otherwise possible by providing an extension which is buoyant on the lower end of the housing 16 to facilitate the introduction into the controlling liquid 74. The indicator 12 generally is fabricated of Lucite or glass while the housing and casing 16 and 14 respectively can be fabricated from polypropylene or nylon. The controlled liquid 60 generally will be water although other liquids such as alcohol can be used where their refractive qualities are necessary.

A modification to the present invention will be found in FIG. 6 wherein similar parts will be designated by similar numerals with the addition of the suffix $a$. This device includes an indicator 12$a$, a protective casing 14$a$ and a housing 16$a$. The modification resides in the provision of a circumferentially disposed rib 80 on the lower extremity of casing 14$a$ and a complementary groove 82 on the inwardly flange 52$a$. The rib and groove 80, 82 are sufficiently rigid to insure maintenance of the assembly during shipment but which will permit intentional separation upon application of opposing axial forces to the housing 16$a$ and casing 14$a$. The rib and groove substantially supplant the male and female thread portions at the extremities of the first embodiment. Similarly, it is possible to provide a frangible joint, not shown, at the point provided by the mating means, namely the rib and groove or threaded portion shown in the first two embodiments. Such a frangible joint would be fractured by the ultimate user by the application of an axial blow. In the rib and groove or frangible joint the fluid 60 could be introduced prior to application of the disc 56 to the lower extremity of the shelf 50.

Thus, the present invention contemplates a protected environment which will permit the use of an optical liquid level indicator in environs which normally would be deleterious to its use. The device provides a controlled liquid for contact with the indicator with the liquid being isolated from the controlling liquid whose level it is desired to measure. In the present embodiment shown the female threads on flange 52, when disassociated with male threads 38, tend to act as a stabilizing means during the axial movement of the shell 50 relative to the reduced neck portion 34. The device shown is generally sealed from the atmosphere and can be utilized in pressurized coolant systems such as the radiators used with internal combustion engines but where required, venting means can be provided. The seal 46 prevents the egress of any gases within container 70 which would tend to follow a free course into the control chamber in either of the positions shown in FIGS. 4 and 5.

It will be recognized that while the embodiments described have shown the use of the protected environment indicator in a container, for purposes of measuring the presence or absence of a predetermined level of liquid in the container, the devices is adaptable for use in other environments. For example, the device could be utilized to indicate the position of a lever or rod, not shown, which would move the housing and its controlled fluid relative to the indicator and thereby present either a light or dark reading at the viewing end of indicator. Additionally, the housing could be moved laterally or the housing could be fixed and the indicator could be the movable element. In any case it is the relative movement between the controlled liquid and the indicator plus the controlled environment of the housing which is important to this invention.

We claim:

1. An optical liquid level indicator comprising a light transmitting rod to be mounted in a container, said rod having an upper exposed end and a lower end, protective means enclosing said indicator and having a buoyant portion surrounding said lower end, said buoyant portion being movable relative to said lower end, liquid means disposed within said buoyant portion beneath said lower end and for contacting said lower end of the indicator as said buoyant portion of the protective means is slideably moved relative to said indicator.

2. An optical liquid level indicator assembly adapted to indicate varying levels of liquid in a container comprising a light transmitting member having the property of refraction when immersed in and the property of reflection when out of a liquid environment, a protective casing for mounting said member in said liquid container and including a buoyant means responsive to the varying levels of liquid to substantially isolate said member from said liquid in said container, liquid means having a lesser volume than said buoyant means and located within said buoyant means beneath said light transmitting member, said liquid means contacting said light transmitting member as the liquid level in the container varies for controlling the light transmitting qualities of said member.

3. An assembly of the type claimed in claim 2 wherein said member is an elongated rod having a light accepting and transmitting end surface externally visible of said protective casing and a light reflecting end at the opposite end, said buoyant means being movably positioned by the varying liquid levels in said container.

4. An assembly of the type claimed in claim 3 wherein said rod is flat at one end and cone shaped at the opposite end.

5. An assembly of the type claimed in claim 3 wherein said protective casing for mounting said member in said container includes an elongated sleeve adapted to encircle and substantially encapsulate said member except for opposite ends thereof, means at one end of said sleeve adapted to removably retain said sleeve relative to an aperture in said container device.

6. An assembly of the type claimed in claim 5 wherein said sleeve is radially enlarged a predetermined extent at one end and provided with male threads for engaging complementary female threads in the aperture in said device.

7. An assembly of the type claimed in claim 5 wherein said sleeve has means to capture said buoyant means and limit the movement of said buoyant means relative to one exposed end of said member.

8. An assembly of the type claimed in claim 7 wherein said means on said sleeve is a radial enlargement circumferentially disposed on said sleeve and presenting male threads, said buoyant means including a hollow cylinder closed at one end and having female threads adjacent the opposite end for complementary engagement with said male threads, stop means extending radially from said sleeve and axially spaced from said male threads, said cylinder adapted to be moved by the liquid contained in said device between the axial limits of said stop and said male threads.

9. An assembly of the type claimed in claim 7 wherein said sleeve and said buoyant means include circumferentially disposed cooperating rib and groove means adapted to initially retain said buoyant means in assembled relation to said sleeve and to serve as said means to capture and limit movement of said buoyant means relative to said sleeve after said buoyant means is forcibly moved in the direction of the opposite mounting end to unseat the rib and groove.

10. An assembly of the type claimed in claim 7 wherein said sleeve and said buoyant means include circumferentially disposed frangible means adapted to initially retain said buoyant means in assembled relation to said sleeve.

References Cited
UNITED STATES PATENTS

| | | | |
|---|---|---|---|
| 1,191,667 | 7/1916 | Charpentier | 73—319 X |
| 1,381,005 | 6/1921 | Pitkin | 73—319 X |
| 1,969,679 | 8/1934 | Wocel | 73—322 |
| 2,145,783 | 1/1939 | Willis | 73—322.5 X |
| 2,510,663 | 6/1950 | Schnessler | 116—118 |
| 2,678,060 | 5/1951 | Arne | 73—322.5 |

LOUIS R. PRINCE, Primary Examiner

DANIEL M. YASICH, Assistant Examiner

U.S. Cl. X.R.

73—322.5, 327; 116—118